United States Patent
Eslami (10) Patent No.: US 12,361,752 B2
(45) Date of Patent: Jul. 15, 2025

(54) FACE DETECTION BASED ON FACIAL KEY-POINTS

(71) Applicants: SONY GROUP CORPORATION, Tokyo (JP); SONY CORPORATION OF AMERICA, New York, NY (US)

(72) Inventor: Ramin Eslami, Livermore, CA (US)

(73) Assignees: SONY CORPORATION OF AMERICA, New York, NY (US); SONY GROUP CORPORATION, Tokyo (JP)

( * ) Notice: Subject to any disclaimer, the term of this patent is extended or adjusted under 35 U.S.C. 154(b) by 888 days.

(21) Appl. No.: 17/542,916

(22) Filed: Dec. 6, 2021

(65) Prior Publication Data

US 2023/0177871 A1 Jun. 8, 2023

(51) Int. Cl.
*G06V 40/16* (2022.01)
*G06T 7/60* (2017.01)
*G06T 7/73* (2017.01)
*G06V 10/82* (2022.01)

(52) U.S. Cl.
CPC .............. *G06V 40/165* (2022.01); *G06T 7/60* (2013.01); *G06T 7/73* (2017.01); *G06V 10/82* (2022.01); *G06T 2207/20084* (2013.01); *G06T 2207/30201* (2013.01)

(58) Field of Classification Search
CPC .... G06V 40/165; G06V 10/82; G06V 40/171; G06T 7/60; G06T 7/73; G06T 2207/20084; G06T 2207/30201; G06T 2207/30196
See application file for complete search history.

(56) References Cited

U.S. PATENT DOCUMENTS

| | | | |
|---|---|---|---|
| 2014/0050358 A1 | 2/2014 | Liu et al. | |
| 2016/0275339 A1 | 9/2016 | De La Torre et al. | |
| 2019/0130580 A1 | 5/2019 | Chen et al. | |
| 2019/0147224 A1* | 5/2019 | Li | G06V 40/165 |
| | | | 382/103 |
| 2022/0319231 A1* | 10/2022 | Pankov | G06T 7/10 |
| 2023/0065399 A1* | 3/2023 | Ren | G06V 20/597 |
| 2024/0013439 A1* | 1/2024 | Funes Mora | G06T 7/85 |
| 2024/0087142 A1* | 3/2024 | Almaev | G06V 10/56 |

OTHER PUBLICATIONS

Li, et al., "Face Detection with End-to-End Integration of a ConvNet and a 3D Model", European Conference on Computer Vision, Sep. 17, 2016, pp. 420-436.

* cited by examiner

*Primary Examiner* — Phuoc Tran
(74) *Attorney, Agent, or Firm* — CHIP LAW GROUP (57) ABSTRACT

An electronic device and method for face detection based on facial key-points is provided. The electronic device receives an image of an object of interest. The image may include a face of the object of interest. The electronic device detects a plurality of key-points associated with the face of the object of interest based on the received image and determines a first coordinate value in the received image based on the detected plurality of key-points. Thereafter, the electronic device determines a region in the received image that includes the face of the object of interest based on the determined first coordinate value and controls the display device to overlay a marker onto the determined region of the face. The marker indicates a location of the determined region in the image.

20 Claims, 5 Drawing Sheets

FACE DETECTION BASED ON FACIAL KEY-POINTS

CROSS-REFERENCE TO RELATED APPLICATIONS/INCORPORATION BY REFERENCE

None.

FIELD

Various embodiments of the disclosure relate to face detection. More specifically, various embodiments of the disclosure relate to an electronic device and method for face detection based on facial key-points.

BACKGROUND

Advancements in the field of image processing have led to development of several techniques for face detection in digital images. Face detection is a technology that is used to find and identify faces in digital images and to generate a bounding box around the identified faces. Face detection may be used as a pre-processing step in a variety of downstream tasks, such as auto-focus, auto exposure, and auto white-balance. Most of the techniques for face detection that are known in the art are based on neural network models. On many devices, it may be difficult to implement the techniques that use neural networks as such techniques may require large amount of processing power as well as time to generate desired results. Due to complexity of the neural networks and processing power requirements, the implementation of neural networks in a variety of devices (especially in low budget devices) can be a challenging task. Due to such challenges, many devices may lack the functionality of face detection and other operations that depend on face detection, as a pre-processing step, in order to achieve their intended objective.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method of face detection based on facial key-points is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for face detection based on facial key-points. Such method, when executed on the electronic device may detect a face in an image quickly based on a plurality of key-points associated with the face. The electronic device may receive an image of an object of interest. The image may include the face of an object of interest. Based on the received image, the electronic device may be configured to detect a plurality of facial key-points associated with the face of the object of interest. The electronic device may determine a first coordinate value in the received image based on the detected plurality of facial key-points and may further determine a region (or a bounding box) in the received image based on the determined first coordinate value. The electronic device may control a display device to overlay a marker onto the determined region of the face. The marker may indicate a location of the determined region in the image.

In contrast to conventional techniques that use dedicated neural networks for face detection, the disclosed electronic device may be configured to detect the face based on facial key-points associated with the face to be detected. The disclosed electronic device may determine a region around the face, based on basic equations of computational geometry (with a low computational complexity) instead on techniques (e.g., techniques that use neural networks) that offer a higher computational complexity. Since the disclosed method uses basic equations of computational geometry, the disclosed electronic device may the determine the region around the face, without constraining the computational resources, power resources, and/or memory resources available on the electronic device. The detection of facial key-points and solution of basic equations can be obtained on low budget devices that may constrained by compute, memory, or power resources. Therefore, the disclosed electronic device may be able to determine the bounding box quickly, effectively, and in an inexpensive manner as compared to the conventional techniques known in the art.

Figure 1:
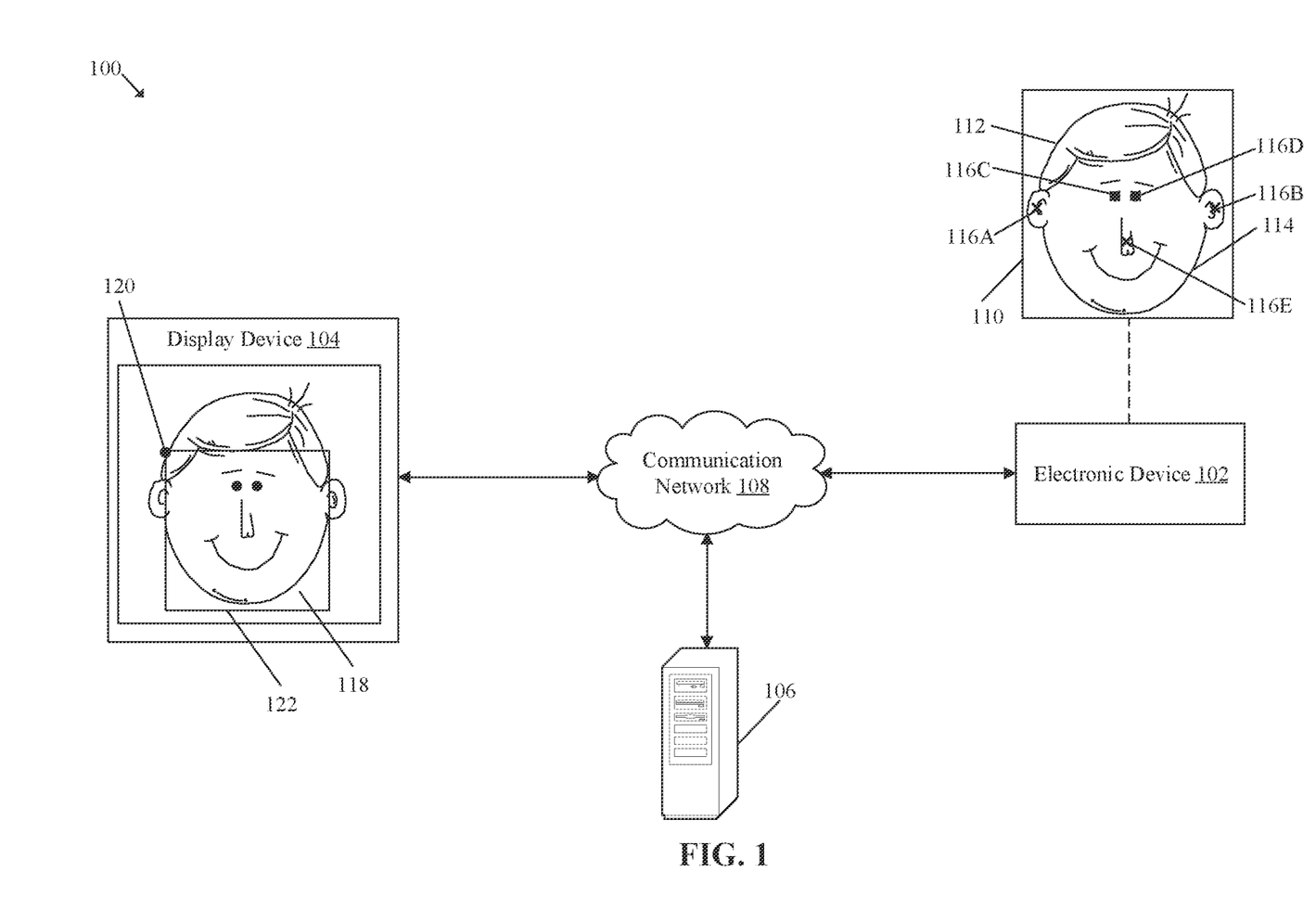
FIG. 1 is a block diagram that illustrates an exemplary network environment for face detection based on facial key-points, in accordance with an embodiment of the disclosure.

FIG. 1 is a block diagram that illustrates an exemplary network environment for face detection based on facial key-points, in accordance with an embodiment of the disclosure. With reference to FIG. 1, there is shown a network environment 100. The network environment 100 may include an electronic device 102, a display device 104, a server 106, and a communication network 108. With reference to FIG. 1, there is further shown an image 110 of the object of interest 112. The image 110 may include a face 114 of the object of interest 112. There is further shown a plurality of key-points 116 associated with the face 114, a region 118, a first coordinate 120, and a marker 122.

The electronic device 102 may include suitable logic, circuitry, interfaces, and or code that may be configured to detect the face 114 of the object of interest 112 in the image 110 and determine the region 118 around the face 114 based on the plurality of key-points 116 associated with the face 114 of the object of interest 112. Examples of the electronic device 102 may include, but are not limited to, a computing device, a smartphone, a cellular phone, a mobile phone, a gaming device, a mainframe machine, a server, a computer workstation, a consumer electronic (CE) device and/or any other device with image processing capabilities.

The display device 104 may include suitable logic, circuitry, and interfaces that may be configured to render an image, such as the image 110 with the marker 122 overlaid onto the determined region 118 overlaid on the image 110. The display device 104 may be a touch screen which may enable a user to provide a user-input via the display device 104. The touch screen may be at least one of a resistive touch screen, a capacitive touch screen, or a thermal touch screen. The display device 104 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 104 may refer to a display screen of a head mounted device (HMD), a smart-glass device, a see-through display, a projection-based display, an electro-chromic display, or a transparent display.

The server 106 may include suitable logic, circuitry, interfaces, and code that may be configured to store the received image 110 and metadata (such as length and width) associated with the received image 110. In some embodiments, the server 106 may be configured to store information associated with facial key-points and coordinate values associated with the key-points and other points around the face. In an embodiment, the server 106 may be implemented as a cloud server which may execute operations through web applications, cloud applications, HTTP requests, repository operations, file transfer, and the like. Other examples of the server 106 may include, but are not limited to a database server, a file server, a web server, a media server, an application server, a mainframe server, a cloud server, or other types of servers. In one or more embodiments, the server 106 may be implemented as a plurality of distributed cloud-based resources by use of several technologies that are well known to those skilled in the art. A person with ordinary skill in the art will understand that the scope of the disclosure may not be limited to implementation of the server 106 and the electronic device 102 as separate entities. In certain embodiments, the functionalities of the server 106 may be incorporated in its entirety or at least partially in the electronic device 102, without departure from the scope of the disclosure.

The communication network 108 may include a communication medium through which the electronic device 102, the display device 104, and the server 106 may communicate with each other. The communication network 108 may be a wired or wireless communication network. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

Figure 3A:
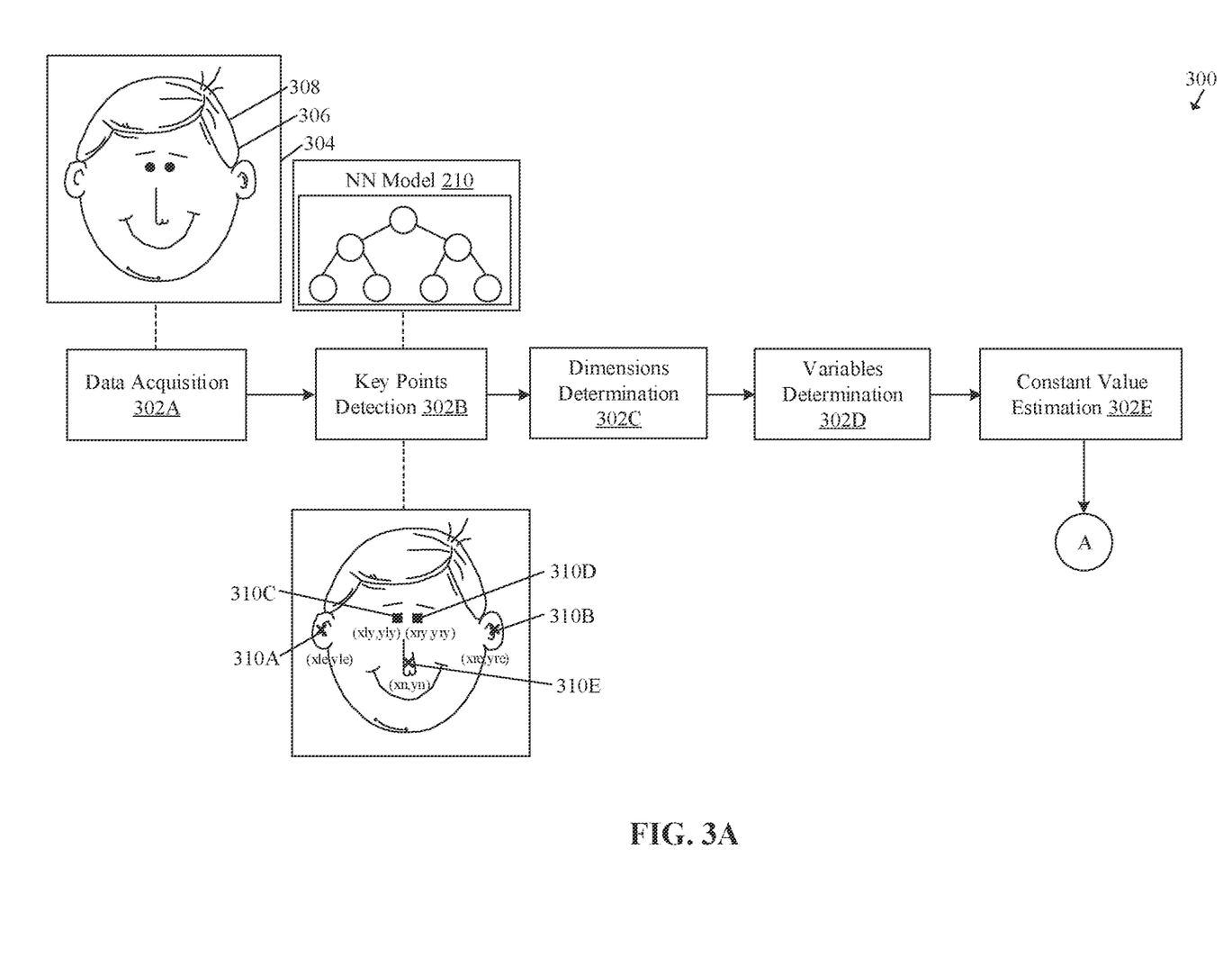
FIGS. 3A and 3B are diagrams that collectively illustrate exemplary operations for face detection based on facial key-points, in accordance with an embodiment of the disclosure.

In operation, the electronic device 102 may be configured to receive the image 110 of the object of interest 112. The object of interest 112 of interest may be an animate or an inanimate object. In accordance with an embodiment, the object of interest 112 may be a human or an animal. The image 110 may include the face 114 of the object of interest 112. Based on the reception of the image 110, the electronic device 102 may be configured to detect the plurality of key-points 116 that may be associated with the face 114 of the object of interest 112. Each of the plurality of key-points 116 may represent a facial feature of the face 114. Such facial features may include, for example, eyes, nose, ear, lips, jaws, eyebrows, and the like. By way of example, and not limitation, the plurality of key-points 116 may include a first key-point 116A that may be associated with a left ear of the object of interest 112, a second key-point 116B that may be associated with a right ear of the object of interest 112, a third key-point 116C that may be associated with a left eye of the object of interest 112, a fourth key-point 116D that may be associated with a right eye of the object of interest 112, and a fifth key-point 116E that may be associated with a nose of the object of interest 112. Details about the detection of the plurality of key-points 116 are provided, for example, in FIG. 3.

The electronic device 102 may be configured to determine a first coordinate value associated with a first coordinate 120 in the received image 110 based on the detected plurality of key-points 116. The first coordinate value may correspond to a first corner for the region 118 to be determined. For example, if the region 118 to be determined is a bounding box, then the first coordinate value may correspond to a corner point on the contour of the bounding box. Details about the determination of the first coordinate value are provided for example, in FIG. 3.

The electronic device 102 may be further configured to determine the region 118 in the received image that includes the face 114 of the object of interest 112 based on the determined first coordinate value. The determined region may be a rectangular patch of the image, for example. Details about the determination of the region are provided, for example, in FIG. 3. After the region 118 is determined, the electronic device 102 may control the display device 104 to overlay the marker 122 onto the determined region 118 of the face 114. The marker 122 may indicate a location of the determined region 118 in the image 110. By way of example, and not limitation, the marker 122 may be a bounding box over the determined region 118 of the face 114.

Modifications, additions, or omissions may be made to FIG. 1 without departing from the scope of the present disclosure. For example, the network environment 100 may include more or fewer elements than those illustrated and described in the present disclosure.

Figure 2:
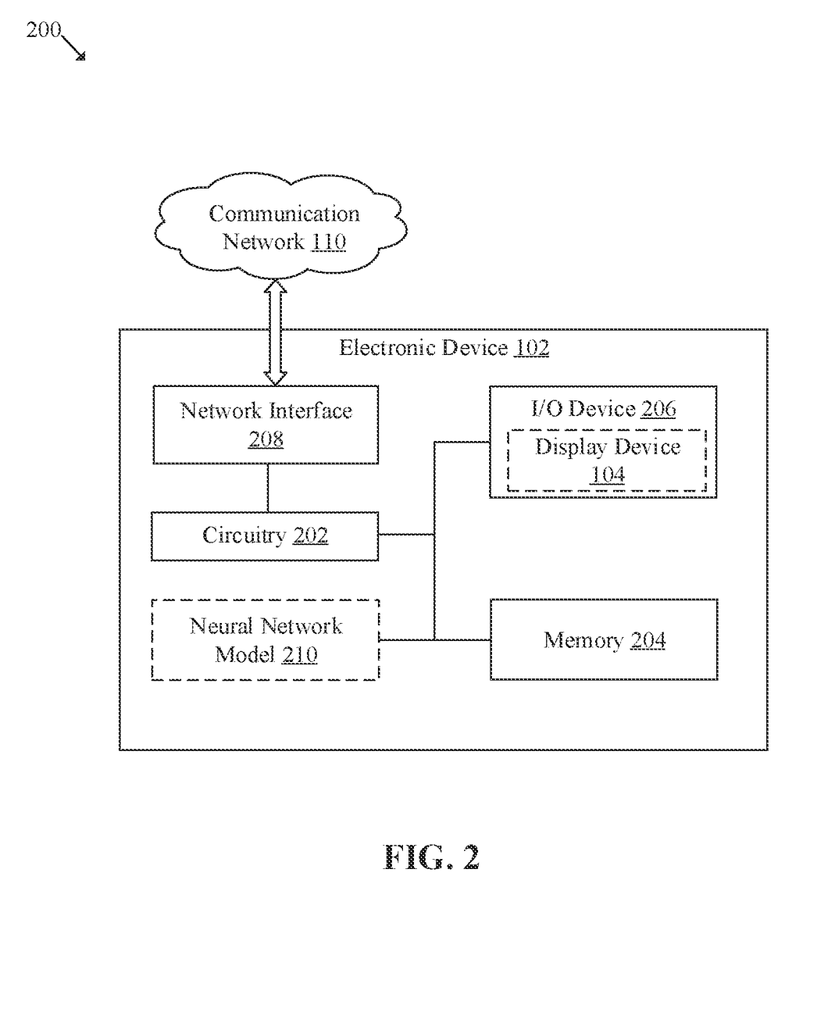
FIG. 2 is a block diagram that illustrates an exemplary electronic device for face detection based on facial key-points, in accordance with an embodiment of the disclosure.

FIG. 2 is a block diagram that illustrates an exemplary electronic device for face detection based on facial key-points, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202 which may perform operations for face detection based on facial key-points. The electronic device 102 may further include a memory 204, an input/output (I/O) device 206, and a network interface 208. The memory 204 may include a neural network (NN) model 210.

The circuitry 202 may be communicatively coupled to the memory 204, the I/O device 206, the network interface 208, and the NN model 210.

The circuitry 202 may include suitable logic, circuitry, and interfaces that may be configured to execute program instructions associated with different operations to be executed by the electronic device 102. For example, some of the operations may include reception of the image 110, detection of the plurality of key-points 116, determination of the first coordinate value, determination of region 118, and controlling the display device 104 to overlay the marker 122 onto the determined region 118 of the face 114. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, interfaces, and/or code that may be configured to store the received image 110, and the detected plurality of key-points 116. The memory 204 may be configured to store pose information, pixel distance information, a height and a width of the image 110, a plurality of variables, and a value of a first constant. The memory 204 may be further configured to store the NN model 210. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive the user input(s) and provide an output based on the received user input(s). The I/O device 206 may be configured to display the determined region 118 overlaid on the face 114 of the object of interest 112. The I/O device 206 which may include various input and output devices, which may be configured to communicate with the circuitry 202. Examples of the I/O device 206 may include, but are not limited to, the display device 104, an audio rendering device, a touch screen, a keyboard, a mouse, a joystick, and a microphone.

The network interface 208 may include suitable logic, circuitry, and interfaces that may be configured to facilitate communication between the circuitry 202, the display device 104, and the server 106, via the communication network 108. The network interface 208 may be implemented by use of various known technologies to support wired or wireless communication of the electronic device 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The NN model 210 may be a computational network or a system of artificial neurons, arranged in a plurality of layers, as nodes. The plurality of layers of the NN model 210 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the NN model 210. Outputs of each hidden layer may be coupled to inputs of at least one node in other layers of the NN model 210. Node(s) in the final layer may receive inputs from at least one hidden layer to output a result. The number of layers and the number of nodes in each layer may be determined from hyper-parameters of the NN model 210. Such hyper-parameters may be set before, while training, or after training the NN model 210 on a training dataset.

Each node of the NN model 210 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the NN model 210. All or some of the nodes of the NN model 210 may correspond to the same or a different mathematical function.

In training of the NN model 210, one or more parameters of each node of the NN model 210 may be updated based on whether an output of the final layer for a given input (from the training dataset) matches a correct result based on a loss function for the NN model 210. The above process may be repeated for the same or a different input till a minima of loss function may be achieved, and a training error may be minimized. Several methods for training are known in art, for example, gradient descent, stochastic gradient descent, batch gradient descent, gradient boost, meta-heuristics, and the like.

The NN model 210 may include electronic data, which may be implemented as, for example, a software component of an application executable on the electronic device 102. The NN model 210 may rely on libraries, external scripts, or other logic/instructions for execution by a processing device, such as the circuitry 202. The NN model 210 may include code and routines configured to enable a computing device, such as the circuitry 202 to perform one or more operations for detection of the plurality of key-points 116 associated with the face 114 from the received image 110 of the object of interest 112. Additionally, or alternatively, the NN model 210 may be implemented using hardware including a processor, a microprocessor (e.g., to perform or control performance of one or more operations), a field-programmable gate array (FPGA), or an application-specific integrated circuit (ASIC). Alternatively, in some embodiments, the NN model 210 may be implemented using a combination of hardware and software. Examples of the NN model 210 may include, but are not limited to, a deep neural network (DNN), a convolutional neural network (CNN), a fully connected neural network, and/or a combination of such networks. Various operations of the circuitry 202 are described further, for example, in FIGS. 3A, 3B, and 4.

Figure 3B:
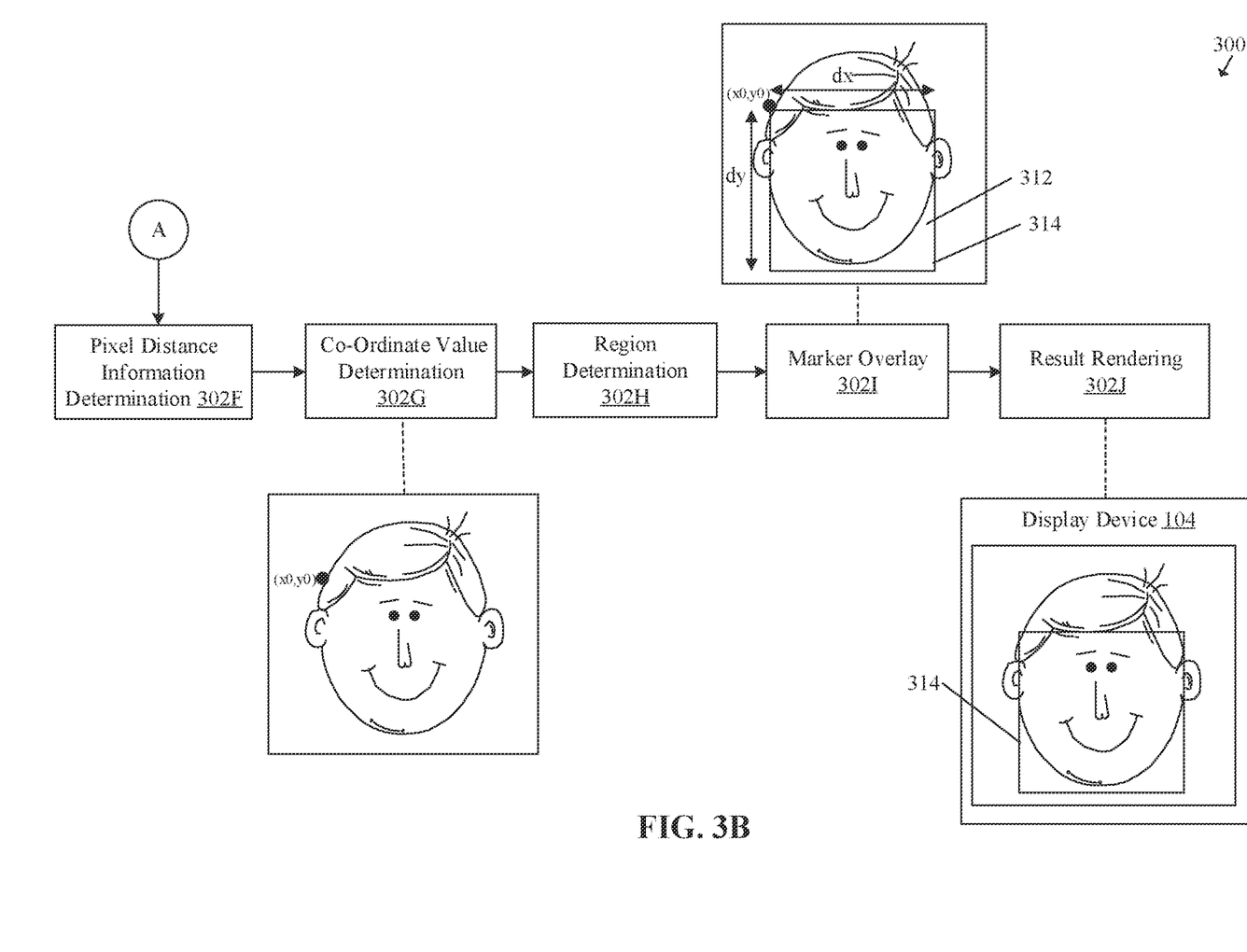

FIGS. 3A and 3B are diagrams that collectively illustrate exemplary operations for face detection based on facial key-points, in accordance with an embodiment of the disclosure. FIGS. 3A and 3B are explained in conjunction with elements from FIG. 1 and FIG. 2. With reference to FIGS. 3A and 3B, there is shown a block diagram 300 that illustrates exemplary operations from 302A to 302J, as described herein. The exemplary operations illustrated in the block diagram 300 may start at 302 and may be performed by any computing system, apparatus, or device, such as by the electronic device 102 of FIG. 1 or the circuitry 202 of FIG. 2. Although illustrated with discrete blocks, the exemplary operations associated with one or more blocks of the block diagram 300 may be divided into additional blocks, combined into fewer blocks, or eliminated, depending on the particular implementation.

At 302A, a data acquisition operation may be performed. In the data acquisition operation, the circuitry 202 may be configured to receive an image 304 of an object of interest 306. The object of interest 306 may be an animate or an inanimate object. In an embodiment, the object of interest may be a human or an animal. The image 304 may include a face 308 of the object of interest 306.

At 302B, a key-points detection operation may be performed. In the key-points detection operation, the circuitry 202 may be configured to detect a plurality of key-points 310 that may be associated with the face 308 of the object of interest 306, based on the received image 304. Each of the plurality of key-points 310 may represent a facial feature of the face 308 of the object of interest 306 and may be referred as a facial landmark or a facial key-point. As shown, for example, the plurality of key-points 310 may include a first key-point 310A, a second key-point 310B, a third key-point 310C, a fourth key-point 310D, and a fifth key-point 310E. The first key-point 310A may be associated with a left ear of the object of interest 306. The second key-point 310B may be associated with a right ear of the object of interest 306. The third key-point 310C may be associated with a left eye of the object of interest 306. The fourth key-point 310D associated with a right eye of the object of interest 306. Similarly, the fifth key-point 310E associated with a nose of the object of interest 306.

In an embodiment, the circuitry 202 may be configured to apply the NN model 210 on the received image 304 of the object of interest 306. The NN model 210 may be a model that may be trained to detect the plurality of key-points 310 associated with the face 308. Based on the application of the NN model 210 on the received image 304, the circuitry 202 may be configured to detect the plurality of key-points 310.

The circuitry 202 may be further configured to determine coordinates associated with each of the plurality of key-points 310. In an embodiment, the NN model 210 may output the coordinates of the determined plurality of key-points 310. For example, the coordinates associated with the first key-point 310A (i.e. the left ear) may be (xle, yle). The coordinates associated with the second key-point 310B (i.e. the right ear) may be (xre,yre). The coordinates associated with the third key-point 310C (i.e. the left eye) may be (xly,yly). The coordinates associated with the fourth key-point 310D (i.e. the right eye) may be (xry,yry). Similarly, the coordinates associated with the fifth key-point 310E (i.e. the nose) may be (xn,yn).

In an embodiment, one or more facial features may not be visible in the image due to pose variations. In such scenarios, the coordinates associated with the corresponding key-points may be (0,0) or nil. For example, if the image 304 is captured from right side, then the left ear and the left eye may not be visible. In such cases, the coordinates associated with the left ear and the left eye may be set to (0,0) or nil. The determined coordinates associated with each of the plurality of key-points 310 may be stored in the memory 204 of the electronic device 102.

At 302C, a dimensions determination operation may be performed. In the dimensions determination operation, the circuitry 202 may be configured to determine a width (W) and a height (H) of the received image 304. The circuitry 202 may be further configured to store the determined width (W) and the determined height (H) of the received image 304 in the memory 204.

At 302D, a variables determination operation may be performed. In variables determination operation, the circuitry 202 may be configured to determine a plurality of variable values associated with a plurality of variables that may be required to determine a region 312 that includes the face 308 of the object of interest 306. The plurality of variable values may include a first variable value, a second variable value, a third variable value, and a pose variable value. The first variable value may be associated with a first variable (x0) and may correspond to a first horizontal value of at least one coordinate associated with at least one of the plurality of key-points 310. The second variable value may be associated with a second variable (x1) and may correspond to a second horizontal value of at least one coordinate associated with at least one of the plurality of key-points 310. The second variable value may be different from the first horizontal value. The third variable value may be associated with a third variable (y) and may correspond to a first vertical value of at least one coordinate associated with at least one of the plurality of key-points 310. Similarly, the pose variable value may be associated with a pose variable (pose) and may correspond to a face pose of the object of interest 306. The face pose may correspond to a head pose and may be described in terms of a location and an orientation of the face 308 with respect to a coordination system of a camera that may capture the image 304 of the face 308 of the object of interest 306. The orientation of the face 308 may be described in terms of three Euler angles, such as yaw, roll, and pitch.

In an embodiment, the circuitry 202 may be configured to retrieve the width (W) of the image 304 from the memory 204 of the electronic device 102. Based on the width (W), the circuitry 202 may be configured to determine the plurality of variable values. In an embodiment, the plurality of variable values may be further determined based on the coordinates associated with each of the plurality of key-points 310.

If the coordinates associated with the third key-point 310C and the fourth key-point 310D are not nil or zero (i.e. when both the eyes are detected), then the circuitry 202 may perform a first set of operations to determine the plurality of variable values (pose, x0, x1, y). In such a scenario where both the eyes may be detected, the pose may be a frontal pose and the value of pose variable may be 0. For example, such first set of operations may include execution of a program code to solve equations (1), which may be given as follows:

$$x0=xry$$
$$x1=xly$$
$$d=x1-x0$$
$$x0=x0-d$$
$$x1=x1+d$$
$$x0=\max(x0,0)$$
$$x1=\min(x1,W)$$
$$y=\min(yly,yry) \quad (1)$$

where,
- x0 represents the first variable,
- x1 represents the second variable,
- y represents the third variable,
- d represents a distance between the first variable value and the second variable value,
- xry represents horizontal value of coordinates associated with the fourth key-point 310D (i.e. the right eye),
- xly represents horizontal value of coordinates associated with the third key-point 310C (i.e. the left eye),
- yry represents vertical value of coordinates associated with the fourth key-point 310D (i.e. the right eye),
- yly represents vertical value of coordinates associated with the third key-point 310C (i.e. the left eye),
- W represents the width of the image 304,
- min(x0,0) provides minimum value from x0 and 0,
- min(x1, W) provides minimum value from x1 and W, and
- min(yly,yry) provides minimum value from yly and yry.

If the coordinates associated with the first key-point 310A and the second key-point 310B are not nil or zero (i.e. when both the ears may be detected), then the circuitry 202 may perform a second set of operations to determine the plurality of variable values (pose, x0, x1, y). In a scenario where both the ears are detected, the pose may be a frontal pose and the value of pose variable may be set to 0. For example, the second set of operations may include execution of a program code to solve equations (2), which may be given as follows:

$$x0=xre$$
$$x1=xle$$
$$Y=yly \quad (2)$$

where,
- x0 represents the first variable,
- x1 represents the second variable,
- y represents the third variable,
- xre represents horizontal value of coordinates associated with the second key-point 310B (i.e. the right ear),
- xle represents horizontal value of coordinates associated with the first key-point 310A (i.e. the left ear), and
- yly represents vertical value of coordinates associated with the third key-point 310C (i.e. the left eye).

In an embodiment the left eye may not be detected. In such a scenario, the third variable value may be set to the vertical value of coordinates associated with the fourth key-point 310D (i.e. yry). In case the left eye is detected, then the circuitry 202 may compare the vertical value of coordinates associated with the fourth key-point 310D (i.e. yry) and the vertical value of coordinates associated with the third key-point 310C (i.e. yly) to determine a minimum value between both the vertical values of coordinates associated with the fourth key-point 310D (i.e. yry) and the third key-point 310C (i.e. yly). The circuitry 202 may assign the minimum value to the third variable (y).

If the coordinate values associated with the fourth key-point 310D are nil or zero (i.e. when the right eye may not be detected) and the coordinate values associated with the first key-point 310A are not nil or zero (i.e. when the left ear may be detected), then the circuitry 202 may perform a third set of operations to determine the plurality of variable values (pose, x0, x1, y). In a scenario where both the ears are detected, the pose may be a right pose and the value of pose variable may be set to 1. For example, the third set of operations may include execution of a program code to solve equations (3), which may be given as follows:

$$y=yly \quad (3)$$

where
- y represents the third variable, and
- yly represents vertical value of coordinates associated with the third key-point 310C (i.e. the left eye).

In an embodiment, the coordinate values associated with the first key-point 310A may not be nil or zero. In such an embodiment, the first variable may be set to the horizontal value of coordinates associated with the third key-point 310C (i.e. x0=xly) and the second variable value may be set to horizontal value of coordinates associated with the first key-point 310A (i.e. x1=xle). In case the coordinate values associated with the fifth key-point 310E is not nil or zero (i.e. if the nose is detected), then the first variable value may be set to the horizontal value of coordinates associated with the fifth key-point 310N (i.e. x0=xn). After setting the first variable value and the second variable, the circuitry 202 may perform a subset of the third set of operations. For example, the subset of the third set of operations may include execution of a program code to solve equations (3.1), which may be given as follows:

$$d=x1-x0$$
$$x0=x0-d/6$$
$$x0=\max(x0,0)$$
$$x1=x1-d/6 \quad (3.1)$$

where,
- d represents a distance between the first variable value and the second variable value,
- x0 represents the first variable,
- x1 represents the second variable, and
- max(x0,0) provides a maximum value from x0 and 0.

If coordinate values associated with the third key-point 310C are nil or zero (i.e. when the left eye is not detected) and the coordinate values associated with the second key-point 310B are not nil or zero (i.e. when the right ear is detected), then the circuitry 202 may perform a fourth set of operations to determine the plurality of variable values (pose, x0, x1, y). In a scenario where both the ears are detected, the pose may be a left pose and the value of pose variable may be set to 2. For example, the fourth set of operations may include execution of a program code to solve equations (4), which may be given as follows:

$$y=yry \quad (4)$$

where
y represents the third variable, and
yry represents vertical value of coordinates associated with the fourth key-point 310D (i.e. the right eye).

In an embodiment, the coordinate values associated with the second key-point 310B may not be nil or zero. In such an embodiment, the first variable may be set to the horizontal value of coordinates associated with the second key-point 310B (i.e. x0=xre) and the second variable value may be set to the horizontal value of coordinates associated with the fourth key-point 310D (i.e. x1=xry). In case the coordinate values associated with the fifth key-point 310E are not nil or zero (i.e. if the nose is detected), then the second variable value may be set to the horizontal value of coordinates associated with the fifth key-point 310N (i.e. x1=xn). After setting the first variable value and the second variable, the circuitry 202 may perform a subset of the fourth set of operations. For example, the subset of the fourth set of operations may include execution of a program code to solve equations (4.1), which may be given as follows:

$$d=x1-x0$$

$$x0=x0+d/6$$

$$x1=x1+d/6$$

$$x1=\min(x1,W) \quad (4.1)$$

where,
d represents a distance between the first variable value and the second variable value,
x0 represents the first variable,
x1 represents the second variable,
W represents the width of the image, and
max(x1,W) provides a maximum value from x1 and W.

If the coordinate values associated with the first key-point 310A, the third key-point 310C, and the fourth key-point 310D are not nil or zero (i.e. when the both eyes and left ear are detected) and the coordinate values associated with the second key-point 310B are nil or zero (i.e. when the right ear is not detected), then the circuitry 202 may perform a fifth set of operations to determine the plurality of variable values (pose, x0, x1, y). In a scenario where both eyes and left ear are detected but right ear is not detected, the pose may be a left half profile pose and the value of pose variable may be set to 3. For example, the fifth set of operations may include execution of a program code to solve equations (5), which may be given as follows:

$$x0=xry$$

$$x1=xle$$

$$d=x1-x0$$

$$x0=x0-d/6$$

$$x1=x1-d/6$$

$$x0=\max(x0,0)$$

$$y=\min(yly,yry) \quad (5)$$

where
x0 represents the first variable,
x1 represents the second variable,
y represents the third variable,
d represents a distance between the first variable value and the second variable value, xry represents horizontal value of coordinates associated with the fourth key-point 310D (i.e. the right eye),
yly represents vertical value of coordinates associated with the third key-point 310C (i.e. the left eye),
yry represents vertical value of coordinates associated with the fourth key-point 310D (i.e. the right eye), and
max(x0,0) provides a maximum value from x0 and 0, and
min(yly, yry) provides a minimum value from yly and yry.

If the coordinate values associated with the second key-point 310B, the third key-point 310C, and the fourth key-point 310D are not nil or zero (i.e. when the both eyes and right ear are detected) and the coordinate values associated with the first key-point 310A are nil or zero (i.e. when the left ear is not detected), then the circuitry 202 may perform a sixth set of operations to determine the plurality of variable values (pose, x0, x1, y). In a scenario where both eyes and right ear are detected but left ear is not detected, the pose may be a right half profile pose and the value of pose variable may be set to 4. For example, the sixth set of operations may include execution of a program code to solve equations (6), which may be given as follows:

$$x0=xre$$

$$x1=xly$$

$$d=x1-x0$$

$$x0=x0+d/6$$

$$x1=x1+d/6$$

$$x1=\min(x1,W)$$

$$y=\min(yly,yry) \quad (6)$$

where,
x0 represents the first variable,
x1 represents the second variable,
y represents the third variable,
d represents a distance between the first variable value and the second variable value,
W represents the width of the received image 304,
yly represents vertical value of coordinates associated with the third key-point 310C (i.e. the left eye),
yry represents vertical value of coordinates associated with the fourth key-point 310D (i.e. the right eye), and
min(x1,W) provides a maximum value from x1 and W, and
min(yly, yry) provides a minimum value from yly and yry.

If the coordinate values associated with the third key-point 310C and the fourth key-point 310D are nil or zero (i.e. when both eyes are not detected), it may be determined that the face 308 of the object is not visible and each of the plurality of variable values (pose, x0, x1, y) may be set to −1. In such a scenario, the face 308 of the object of interest 306 may not be visible in the image 304 and the region 312 may not be determined.

In accordance with an embodiment, the circuitry 202 may be configured to execute the first set of operations irrespective of whether the coordinate values of each of the plurality of key-points 310 is (0,0) or any other numerical value. In other words, the execution of the first set of operations may precede the execution of the second set of operations, the third set of operations, the fourth set of operations, the fifth set of operations, or the sixth set of operations. As discussed, if the pose variable value is 0, then it may be determined that the pose is a frontal pose. If the pose variable value is 1, then it may be determined that the pose is a left profile pose. If the value of the pose variable is 2, then it may be determined that the pose is a right profile pose. If the pose variable value is 3, then it may be determined that the pose is a left profile pose a left half profile pose. If the pose variable value is 4, then it may be determined that the pose is a right half profile pose. In case the pose variable value is −1, then it may be determined that the face 308 of the object of interest 306 is not visible in the image 304 and the region 312 may not be determined. In such scenarios, an error message may be displayed indicating that the face 308 cannot be detected.

At 302E, a constant value estimation operation may be performed. In the constant value estimation operation, the circuitry 202 may be configured to estimate a value of a first constant (A) based the determined plurality of variable values. Specifically, the value of the first constant (A) may be determined based on the pose variable value. In an embodiment, if the pose variable value is 0, then the value of the first constant (A) may be 1.25. If the pose variable value is 1 or 2, then the value of the first constant (A) may be 1.8. Otherwise, if the pose variable value is 3 or 4, then the value of the first constant (A) may be 1.6.

At 302F, a pixel distance information determination operation may be performed. In the pixel distance information determination operation, the circuitry 202 may be configured to determine pixel distance information that may include a first parameter (dx) and a second parameter (dy). The first parameter (dx) may correspond to a width (WR) for a region 312 and the second parameter (dy) may correspond to a height (HR) for the region 312.

In an embodiment, the pixel distance information may be determined based on the plurality of variable values. For example, the first parameter (dx) may be determined based on the first variable value (x0) and the second variable value (x1). As another example, the first parameter (dx) may be determined based on equation (7), which may be given as follows:

$$dx = x1 - x0 \qquad (7)$$

In an embodiment, if the value of the first parameter (dx) is less than 15, then the value of first parameter (dx) may be set to −1. Otherwise, the value of the first parameter (dx) may be the same as provided by equation (7). It should be noted that if the value of first parameter (dx) is −1, then the region 312 may not be determined. In such scenarios, an error message may be displayed indicating that the region 312 cannot be determined.

Based on the determination of the first parameter (dx), the circuitry 202 may be further configured to determine the second parameter (dy). The second parameter (dy) may be determined based on the estimated value of the first constant (A) as described at 302E and the determined first parameter (dx) from equation (7). For example, the second parameter (dy) may be determined based on equation (8), which may be given as follows:

$$dy = A * dx \qquad (8)$$

In an embodiment, the circuitry 202 may be configured add the third variable value of the third variable (y0) and the value of the second parameter (dy). In case, a result of the addition of the third variable value the value of the second parameter (dy) is greater than the height (H) of the image, then the value of the second parameter (dy) determined based on equation (8.1), which may be given as follows:

$$dy = H - y0 \qquad (8.1)$$

At 302G, a coordinate value determination operation may be performed. In the coordinate value determination operation, the circuitry 202 may be configured to determine a first coordinate value (x0,y0) in the received image 304. The determined first coordinate value may represent a point in the image 304. Specifically, the first coordinate value may represent a first corner for the region 312 to be determined. The first corner may be a top left corner of the region 312. In another embodiment, the first corner may be a top right or bottom right or bottom left corner of the region 312. In an embodiment, a horizontal coordinate (x0) of the first coordinate value may be the same as the first parameter (dx). In an embodiment, a vertical coordinate (y0) of the first coordinate value (x0,y0) may be determined based on the second parameter (dy), the height (H) of the received image 304, and the third variable value (y). In an embodiment, the circuitry 202 may perform a seventh set of operations on the vertical coordinate (y0) of the first coordinate value (x0,y0) The seventh set of operations may include execution of a program code to solve equations (9), which may be given as follows:

$$y0 = y - (dy/2.5)$$

$$y0 = \max(y0, 0) \qquad (9)$$

At 302H, a region determination operation may be performed. In the region determination operation, the circuitry 202 may be configured to determine the region 312 in the received image 304. The determined region 312 may include the face 308 of the object of interest 306. In an embodiment, the circuitry 202 may be configured to determine the region 312 based on the determined first coordinate value and the determined pixel distance information. The pixel distance information may correspond to a length and the breadth (or width) of the determined region 312. For example, the first coordinate associated with the top left corner of the region 312 may be (x0,y0), a second coordinate associated with a top right corner of the region 312 may be (x0+dx, y0), a third coordinate associated with a bottom left corner of the region 312 may be (x0,y−dy), and a fourth coordinate associated with a bottom right corner of the region 312 may be (x0+dx,y−dy).

At 302I, a marker overlay operation may be performed. In the marker overlay operation, the circuitry 202 may be configured to overlay a marker 314 onto the determined region 312 of the face 308. The marker 314 may indicate a location of the determined region 312 in the image 304. The marker 314 may be a bounding box, for example.

At 302J, a result rendering operation may be performed. In the result rendering operation, the circuitry 202 may be configured to control the display device 104 to display the overlaid marker 314 on the determined region 312 of the face 308 of the object of interest 306. In an embodiment, the marker 314 may be highlighted to indicate the determined region 312. As discussed, the determined region 312 may include the face 308 of the object of interest 306.

Therefore, the disclosed electronic device 102 may be capable of determining the region 312 quickly as compared to conventional techniques known in the art. Also, the proposed electronic device 102 may use a very low-complexity and fast algorithm while providing an accurate facial bounding box (or the region 312) estimation.

Figure 4:
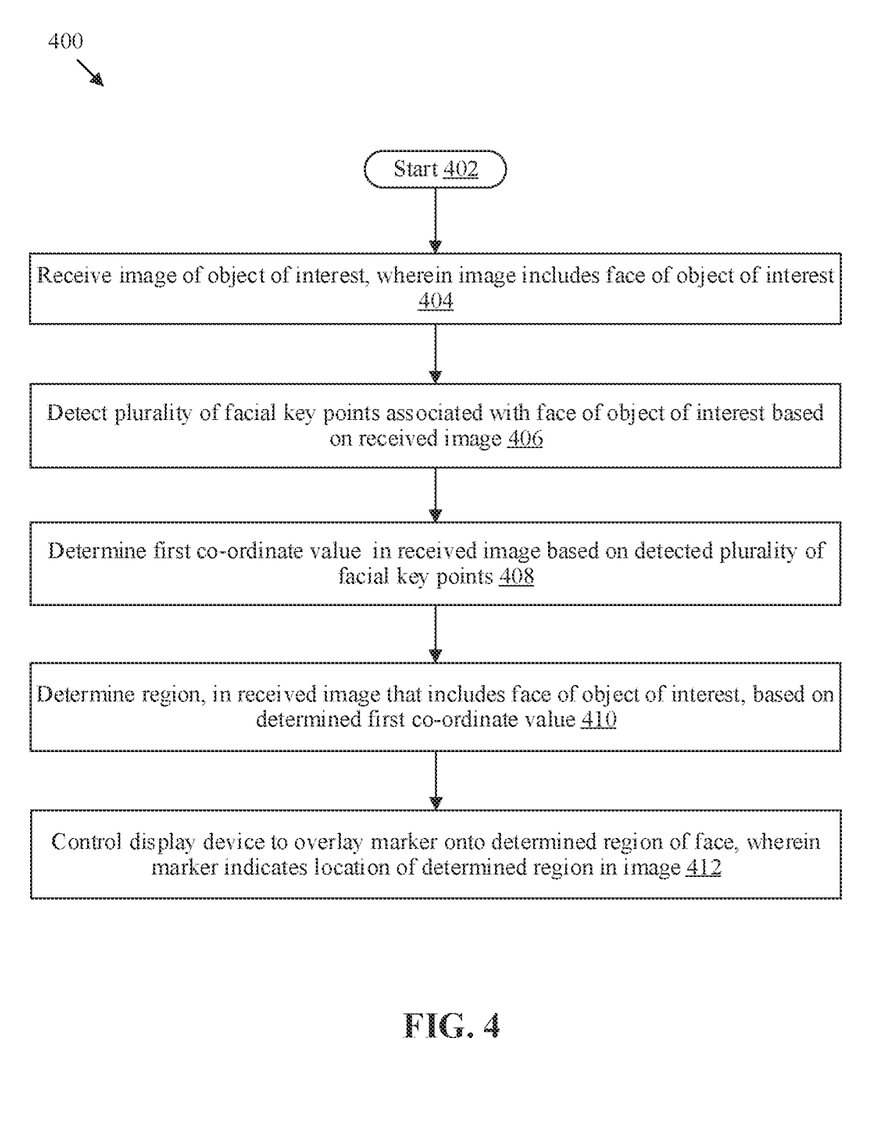
FIG. 4 is a flowchart that illustrates exemplary operations for face detection based on facial key-points, in accordance with an embodiment of the disclosure.

FIG. 4 is a flowchart that illustrates exemplary operations for face detection based on facial key-points, in accordance with an embodiment of the disclosure. FIG. 4 is explained in conjunction with elements from FIG. 1, FIG. 2, FIG. 3A, and FIG. 3B. With reference to FIG. 4, there is shown a flowchart 400. The operations from 402 to 412 may be implemented on any computing device, for example, the electronic device 102 or the circuitry 202. The operations may start at 402 and proceed to 404.

At 404, the image 110 of the object of interest 112 may be received and image 110 may include the face 114 of the object of interest 112. In one or more embodiments, the circuitry 202 may be configured to receive the image 110 of the object of interest 112, wherein the image 110 includes the face 114 of the object of interest 112. The details about the reception of the image 110 of the object of interest 112 are provided for example, in FIGS. 1, 3A, and 4.

At 406, the plurality of facial key-points 116 associated with the face 114 of the object of interest 112 may be detected based on the received image 110. In one or more embodiments, the circuitry 202 may be configured to detect the plurality of key-points 116 associated with the face 114 of the object of interest 112 based on the received image 110. The details about the detection of the plurality of key-points 116 are provided, for example, in FIGS. 1, and 3A.

At 408, the first coordinate value in the received image 110 may be determined based on the detected plurality of key-points 116. In one or more embodiments, the circuitry 202 may be configured to determine the first coordinate value in the received image 110 based on the detected plurality of key-points 116. The details about determination of the first coordinate value are provided, for example, in FIGS. 1 and 3B.

At 410, the region 118 in the received image 110 that includes the face 114 of the object of interest 112 may be determined based on the determined first coordinate value. In one or more embodiments, the circuitry 202 may be configured to determine the region 118 in the received image 110 that includes the face 114 of the object of interest 112 based on the determined first coordinate value. The details about the determination of the region 118 are provided, for example, in FIGS. 1 and 3B.

At 412, the display device 104 may be controlled to overlay the marker 122 onto the determined region 118 of the face 114 and the marker 122 may indicate the location of the determined region 118 in the image 110 as the marker 122 is described, for example, in FIGS. 1 and 3B. In one or more embodiments, the circuitry 202 may be configured to control the display device 104 to overlay the marker 122 onto the determined region 118 of the face 114. Control may pass to end.

Various embodiments of the disclosure may provide a non-transitory computer-readable medium and/or storage medium having stored thereon, computer-executable instructions executable by a machine and/or a computer such as the electronic device 102. The computer-executable instructions may cause the machine and/or computer to perform operations that may include reception of the image 110 of the object of interest 112. The image 110 may include the face 114 of the object of interest 112. The operations may further include detection of the plurality of key-points 116 associated with the face 114 of the object of interest 112 based on the received image 110. The operations may further include determining a first coordinate value in the received image 110 based on the detected plurality of key-points 116. The operations may further include determining the region 118 in the received image 110 that may include the face 114 of the object of interest 112 based on the determined first coordinate value. The operations may further include controlling the display device 104 to overlay the marker 122 onto the determined region 118 of the face 114. The marker may indicate a location of the determined region 118 in the image 110.

Exemplary aspects of the disclosure may include an electronic device (such as the electronic device 102 of FIG. 1) that may include circuitry (such as the circuitry 202). The circuitry may be configured to receive an image (such as the image 304) of an object of interest (such as the object of interest 112). The image includes a face (such as the face 308) of the object of interest. The electronic device may be further configured to apply a NN model (such as the NN model 210) on the received image of the object of interest and detect a plurality of facial key-points (such as the plurality of key-points 116) associated with the face based on the application of the NN model on the received image. The detected plurality of facial key-points includes a first key-point (such as the first key-point 116A) associated with a left ear of the object of interest, a second key-point (such as the second key-point 116B) associated with a right ear of the object of interest, a third key-point (such as the third key-point 116C) associated with a left eye of the object of interest, a fourth key-point (such as the fourth key-point 116D) associated with a right eye of the object of interest, and a fifth key-point (such as the fifth key-point 116E) associated with a nose of the object of interest.

In accordance with an embodiment, the circuitry may be further configured to estimate a width of the received image and determine a plurality of variable values based on the detected plurality of facial key-points and the estimated width of the received image. The detected plurality of variable value may include a first variable value, a second variable value, a third variable value, and a pose variable value. The first variable value may correspond to a first horizontal value of a first coordinate value. The second variable value may correspond to a second horizontal value that may be different from the first variable value. The third variable value corresponds to a first vertical value and the pose variable value correspond to a pose of the face of the object of interest.

In accordance with an embodiment, the circuitry may be further configured to determine pose information related to the face of the object of interest based on the detected plurality of facial key-points. The circuitry may be further configured to determine pixel distance information based on the determined pose information and the detected plurality of facial key-points. In an embodiment, the pixel distance information corresponds to a length and a breadth of a region (such as the region 118). The circuitry may be further configured to determine a first coordinate value in the received image based on the detected plurality of facial key-points. In an embodiment, the determined first coordinate value corresponds to a first corner of the determined region. The circuitry may further estimate a value of a first constant based the determined plurality of variable values and further determine a height of the received image.

The circuitry may be further configured to determine the region (such as the region 118) in the received image that includes the face of the object of interest based on the determined pose information, determined pixel distance information, determined first coordinate value the estimated value of the first constant, and the determined height. The circuitry may be further configured to control a display device (such as the display device 104) to display the overlay a marker (such as the marker 122) onto the determined region of the face. The marker may indicate a location of the determined region in the image.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
    circuitry configured to:
        receive an image of an object of interest, wherein the image includes a face of the object of interest;
        detect a plurality of facial key-points based on the received image, wherein the plurality of facial key-points is associated with the face of the object of interest;
        determine a first coordinate value in the received image based on the detected plurality of facial key-points;
        determine a plurality of variable values based on the detected plurality of facial key-points, wherein the plurality of variable values comprises a pose variable value that corresponds to a pose of the face of the object of interest;
        determine a height of the received image based on the pose variable value;
        determine a region in the received image based on the determined first coordinate value, the determined plurality of variable values, and the determined height, wherein the determined region includes the face of the object of interest; and
        control a display device to overlay a marker on the determined region of the face, wherein the marker indicates a location of the determined region in the image.

2. The electronic device according to claim 1, wherein the detected plurality of facial key-points comprises:
    a first key-point associated with a left ear of the object of interest,
    a second key-point associated with a right ear of the object of interest,
    a third key-point associated with a left eye of the object of interest,
    a fourth key-point associated with a right eye of the object of interest, and
    a fifth key-point associated with a nose of the object of interest.

3. The electronic device according to claim 1, wherein the circuitry is further configured to:
    determine pose information based on the detected plurality of facial key-points, wherein the pose information is associated with the face of the object of interest;
    determine pixel distance information based on the determined pose information and the detected plurality of facial key-points; and
    determine the region in the received image based on the determined pixel distance information.

4. The electronic device according to claim 3, wherein the pixel distance information corresponds to a length of the determined region and a breadth of the determined region.

5. The electronic device according to claim 1, wherein the circuitry is further configured to:
    determine a width of the received image;
    determine the plurality of variable values based on the detected plurality of facial key-points and the determined width of the received image; and
    determine the region based on the determined plurality of variable values.

6. The electronic device according to claim 1, wherein the plurality of variable values further comprises a first variable value, a second variable value, and a third variable value.

7. The electronic device according to claim 1, wherein the circuitry is further configured to:
    determine a value of a specific constant based the determined plurality of variable values;
    determine the height of the received image based on the determined value of the specific constant; and
    determine the region based on the determined value of the specific constant and the determined height.

8. The electronic device according to claim 6, wherein
    the first variable value corresponds to a first horizontal value,
    the first horizontal value is associated with the first coordinate value,
    the second variable value corresponds to a second horizontal value,
    the second horizontal value is different from the first horizontal value, and
    the third variable value corresponds to a first vertical value.

9. The electronic device according to claim 1, wherein the determined first coordinate value corresponds to a specific corner of the determined region.

10. The electronic device according to claim 1, wherein the circuitry is further configured to:
    apply a neural network (NN) model on the received image of the object of interest; and
    detect the plurality of facial key-points associated with the face based on the application of the NN model on the received image.

11. The electronic device according to claim 1, wherein the object of interest is one of a human or an animal.

12. A method, comprising:
    in an electronic device:
        receiving an image of an object of interest, wherein the image includes a face of the object of interest;
        detecting a plurality of facial key-points based on the received image, wherein the plurality of facial key-points is associated with the face of the object of interest;

determining a first coordinate value in the received image based on the detected plurality of facial key-points;

determining a plurality of variable values based on the detected plurality of facial key-points, wherein the plurality of variable values comprises a pose variable value that corresponds to a pose of the face of the object of interest;

determining a height of the received image based on the pose variable value;

determining a region in the received image based on the determined first coordinate value, the determined plurality of variable values, and the determined height, wherein the determined region includes the face of the object of interest; and controlling a display device to overlay a marker on the determined region of the face, wherein the marker indicates a location of the determined region in the image.

13. The method according to claim 12, wherein the detected plurality of facial key-points comprises:
   a first key-point associated with a left ear of the object of interest,
   a second key-point associated with a right ear of the object of interest,
   a third key-point associated with a left eye of the object of interest,
   a fourth key-point associated with a right eye of the object of interest, and
   a fifth key-point associated with a nose of the object of interest.

14. The method according to claim 12, further comprising:
   determining pose information based on the detected plurality of facial key-points, wherein the pose information is associated with the face of the object of interest;
   determining pixel distance information based on the determined pose information and the detected plurality of facial key-points; and
   determining the region in the received image based on the determined pixel distance information.

15. The method according to claim 14, wherein the pixel distance information includes a length of the determined region and a breadth of the determined region.

16. The method according to claim 12, further comprising:
   determining a width of the received image;
   determining the plurality of variable values based on the detected plurality of facial key-points and the determined width of the received image; and
   determining the region based on the determined plurality of variable values.

17. The method according to claim 16, wherein the plurality of variable values further comprises of a first variable value, a second variable value, and a third variable value.

18. The method according to claim 16, further comprising:
   determining a value of a specific constant based the determined plurality of variable values;
   determining the height of the received image based on the determined value of the specific constant; and
   determining the region based on the determined value of the specific constant and the determined height.

19. The method according to claim 17, wherein
   the first variable value corresponds to a first horizontal value,
   the first horizontal value is associated with the first coordinate value,
   the second variable value corresponds to a second horizontal value,
   the second horizontal value is different from the first horizontal value, and
   the third variable value corresponds to a first vertical value.

20. A non-transitory computer-readable medium having stored thereon, computer-executable instructions that when executed by an electronic device, causes the electronic device to execute operations, the operations comprising:
   receiving an image of an object of interest, wherein the image includes a face of the object of interest;
   detecting a plurality of facial key-points based on the received image, wherein the plurality of facial key-points is associated with the face of the object of interest;
   determining a first coordinate value in the received image based on the detected plurality of facial key-points;
   determining a plurality of variable values based on the detected plurality of facial key-points, wherein the plurality of variable values comprises a pose variable value that corresponds to a pose of the face of the object of interest;
   determining a height of the received image based on the pose variable value;
   determining a region in the received image based on the determined first coordinate, the determined plurality of variable values, and the determined height, wherein the determined region includes the face of the object of interest; and
   controlling a display device to overlay a marker on the determined region of the face, wherein the marker indicates a location of the determined region in the image.

* * * * *